(12) United States Patent
Mason et al.

(10) Patent No.: US 7,917,567 B1
(45) Date of Patent: Mar. 29, 2011

(54) FLOATING-POINT PROCESSING UNIT FOR SUCCESSIVE FLOATING-POINT OPERATIONS

(75) Inventors: Jeffrey M. Mason, Eldorado Springs, CO (US); David W. Bennett, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 964 days.

(21) Appl. No.: 11/810,719

(22) Filed: Jun. 7, 2007

(51) Int. Cl.
*G06F 7/483* (2006.01)

(52) U.S. Cl. ........................................................ 708/495

(58) Field of Classification Search ........................ None
See application file for complete search history.

(56) References Cited

U.S. PATENT DOCUMENTS

| | | | |
|---|---|---|---|
| 6,904,446 B2 * | 6/2005 | Dibrino | 708/501 |
| 7,730,117 B2 * | 6/2010 | Fleischer et al. | 708/497 |
| 2003/0041082 A1 * | 2/2003 | Dibrino | 708/501 |
| 2006/0179097 A1 * | 8/2006 | Fleischer et al. | 708/495 |

\* cited by examiner

*Primary Examiner* — David H Malzahn

(74) *Attorney, Agent, or Firm* — W. Eric Webostad; LeRoy D. Maunu

(57) ABSTRACT

A floating-point processing unit for a succession of floating-point operations. An exponent adjustor is coupled to receive numerical inputs and configured to generate first adjusted values from the numerical inputs. The first adjusted values have equivalent exponents as between corresponding first adjusted values. A first operation specific floating-point processing unit (OFPU) is coupled to receive the first adjusted values and includes first arithmetic circuitry configured for a first floating-point operation on the first adjusted values to provide first numerical results. The first numerical results are not normalized prior to a second floating-point operation.

18 Claims, 4 Drawing Sheets

FLOATING-POINT PROCESSING UNIT FOR SUCCESSIVE FLOATING-POINT OPERATIONS

FIELD OF THE INVENTION

One or more aspects of the invention relate generally to integrated circuits and, more particularly, to a floating-point processing unit for a succession of floating-point operations.

BACKGROUND

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex® FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

Floating-point operations based upon values normalized in accordance with IEEE-754 floating-point format are well known. Generally, there is single precision or double precision, which respectively are 32-bit wide and 64-bit wide values. A floating-point number consists of three distinct fields referred to as the sign (s), significand (b) and exponent (E). The value of a valid floating point number is defined as $V=(-1)^s*2^E*(b_0.b_1b_2 \ldots b_{p-1})$ where $b_0 \ldots b_{p-1}$ is the binary representation of the significand (referred to as f). The value p is the number of bits in the floating point number.

In single precision, bit positions 0 through 22 [22:0] are for the significand, and bit positions 23 through 30 [30:23] are for the exponent field. Bit position 31 is a sign bit, which is a logic 0 for positive values or a logic 1 for negative values. Additionally, for the exponent value, a bias value of $2^{127}$ is used as is known. In double precision, bit positions 0 through 51 [51:0] are for the significand, and bit positions 52 through 62 [62:52] are for the exponent field. Bit position 63 is a sign bit, which is a logic 0 for positive values or a logic 1 for negative values. Additionally, for the exponent value, a bias value of $2^{1023}$ is used as is known. Thus, the format for both single and double precision is basically the same other than the number of bits and the bias.

For example, the value of 9.9 in single precision is a logic 0 for the sign bit, a 10000010 for the exponent field, and a 1.00111100110011001100110 for the significand. The IEEE-754 standard requires that all valid floating-point numbers have a single unique representation so a leading logic 1 is assumed as part of the significand. This floating-point representation is gotten by continually dividing the original value 9.9 by 2 until a leading one is generated in the answer. The number of times this is done gives the unbiased exponent. The remaining value is then multiplied by $2^{24}$ for single precision numbers and then converted to binary to get the significand. Following this procedure gives the following:

9.9/2=4.95 (unbiased exponent=1): continue
4.98/2=2.475 (unbiased exponent=2): continue
2.475/2=1.2375 (unbiased exponent=3): stop
  i. Biased exponent E=3+127=130=b10000010
  ii. Signifand f=1.2375. Multiple by $2^{23}$ to get 20761804.8=b10011110011001100110011001100
Sign=0

The final single precision representation of 9.9 is

```
S EEE EEEE E fff ffff ffff ffff ffff ffff ffff
0 100 0001 0 001 1110 0110 0110 0110 0110 0110
```

A value which is expressed as a single digit in front of the radix, with or without some fractional remainder (or mantissa), multiplied by a base number ("base") to a power is considered normalized form. By convention, values are stored as normalized numbers. If this is base 10, then this normalized form is known as scientific notation. Scientific notation is used in the following examples, as it is more easily followed than base 2, which is used by binary-based computers.

For example, the decimal value of 100 in scientific notation is $1\times10^2$. However, there are other possible expressions for the decimal value of 100. For example, $100\times10^0$, and $0.1\times10^3$ are two alternative ways of expressing the decimal value of 100. However, expressions of $100\times10^0$ and $0.1\times10^3$ for 100 are not normalized to what is the accepted standard format, namely a single digit in front of the radix followed by a mantissa multiplied by a base number with an exponent. Only the value $1\times10^2$ conforms to this requirement and is so considered the unique normalized form of this number.

However, as is known, if two numbers have the same base and the base is raised to the same power, the numbers may be added (or subtracted) using the significand only. So, for example, the normalized value of 2000, namely $2\times10^3$, may have its significand directly added (or subtracted) to the non-normalized value of 20, namely $0.02\times10^3$, to yield $2.02\times10^3$ (or $1.88\times10^3$). On the other hand these numbers may be multiplied (or divided) by performing the operation on the significand and then adding (or subtracting) the exponents. So, for example, $2\times10^3$ may be multiplied by $2\times10^1$ by multiplying the significands to get $2*2=4$ and then adding the exponents to get $3+1=4$. In normalized form this would be $4\times10^4=4000$. The same sort of logic applies to division.

Heretofore, for each floating-point operation that requires matching exponents (add, subtract), normalized inputs were obtained and if one or more of the exponents were different, then one or more normalized inputs is "exponent adjusted" to a non-normalized value so all inputs have equivalent exponents. This adjustment (also known as "exponent alignment") means that significand values are shifted such that all inputs have a common exponent. The floating-point operation, which may be any of a variety of known arithmetic operations, is then performed on the sign bits, the significands, and the exponents of the inputs separately to provide a sign output, a significand output, and an exponent output. The three outputs are combined and normalized back to IEEE-754 compliant normalized form with a leading implied value of 1 in front of the radix. This normalization is done prior to a subsequent floating-point operation, and for the subsequent floating-point operation, the number may be exponent adjusted once again.

Floating-point operations that did not require matching exponents (multiply, divide) would perform their operation on their normalized inputs and then the possibly non-normalized result is normalized back to IEEE-754 compliant form with a leading implied decimal value of 1 in front of the radix. This normalization is done prior to a subsequent floating-point operation, and for the subsequent floating-point operation, the number may be exponent adjusted once again.

Current processor-based architectures use this set of three phases, namely exponent adjustment of input if needed, floating-point operation, and normalization of output if required, for each floating-point operation. Conventionally, floating-point operations are processed by a general-purpose floating-point processing unit ("FPU"). For a conventional general-purpose FPU, each value input to the FPU is in a normalized form and each output from the FPU is in a normalized form, and the normalized form for each input and each output is IEEE-754 compliant notation for each floating-point operation performed.

When instantiating circuitry for floating-point operations in programmable logic, conventionally a single general-purpose FPU core is used to process all floating point operations. However, such an FPU core may include unused functionality, and thus significant programmable logic resource overhead consumed by instantiation of such an FPU core may otherwise go unused. Also, the FPU core can create a computational bottleneck in the potentially parallel compute fabric as well as routing congestion to connect all of the disparate floating point operations to this single FPU core.

Accordingly, it would be desirable and useful to provide an FPU that involved less overhead, was not a computational bottleneck and did not require large amounts of connectivity to separate spatial locations.

SUMMARY

One or more aspects of the invention generally relate to integrated circuits and, more particularly, to multiple operation specific floating-point processing units for a succession of floating-point operations.

An aspect of the invention provides a floating-point processing unit. Two or more operation specific floating-point processing units (OFPUs) are coupled together to perform a sequence of floating-point operations. Each OFPU is tailored to only contain the circuitry necessary to perform a single floating-point operation. Each OFPU can be tailored to generate normalized or non-normalized outputs. Typically, only those OFPUs whose outputs are going to be saved to memory or passed out of the currently implemented circuitry are normalized. In some embodiments, each OFPU is tailored to know if each input is in normalized or non-normalized form.

For at least a first OFPU, an exponent adjustor is coupled to receive numerical inputs and configured to generate first adjusted values from the numerical inputs if needed for that operation. The first adjusted values have equivalent exponents if needed for that operation. In some embodiments, an exponent adjustor is only provided for OFPUs known to require such a function. The first OFPU is coupled to receive the first adjusted values and includes first arithmetic circuitry configured for a first floating-point operation on the first adjusted values to provide first numerical results. A second OFPU receives the first numerical results, where the second OFPU includes second arithmetic circuitry configured for a second floating-point operation on the first numerical results to provide second numerical results. The first numerical results are not normalized prior to the second floating-point operation.

Another aspect of the invention provides a method for floating-point processing. Floating-point operations are separately instantiated in circuitry and OFPU stages are provided. Numerical inputs are obtained to be processed using the floating-point operations. A first floating-point operation of the floating-point operations is performed on the first portion of the input numbers to provide a first numerical result. The inputs to this operation may be exponent adjusted to have matching exponents (a first exponent) if required by that operation (e.g., addition or subtraction). The output from this operation is not normalized upon completion of the operation if that value is only consumed by another floating point operation. A second floating-point operation of the floating-point operations on the first numerical result and on the second portion of the input numbers is performed to provide a second numerical result. If this second floating-point operation requires matching exponents (e.g., addition or subtraction), then the inputs are exponent adjusted to a second exponent prior to the second floating-point operation. The second numerical result has the second exponent. The second floating-point operation is performed without normalizing the first numerical result obtained from the first floating-point operation.

According to this aspect of the invention, one or more of the inputs to the second floating-point operation that were produced from the first floating-point operation may be noted as being in non-normalized form already and so may require different exponent adjustment circuitry than those inputs that are in normalized form. This is due to the implied leading '1' in normalized values. The absence of the normalization of outputs between each stage of the overall floating-point operation leads to a faster execution rate, as well as reducing the amount of circuitry required to implement the complete structure.

Yet another aspect of the invention provides a method for floating-point processing. The method includes providing floating-point operations in circuitry in stages; obtaining numerical inputs to be processed using the floating-point operations; equalizing exponents of associated values at least in part for respective portions of the numerical inputs; and performing the floating-point operations in the stages for processing with the circuitry to provide numerical results without normalization between the floating-point operations.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
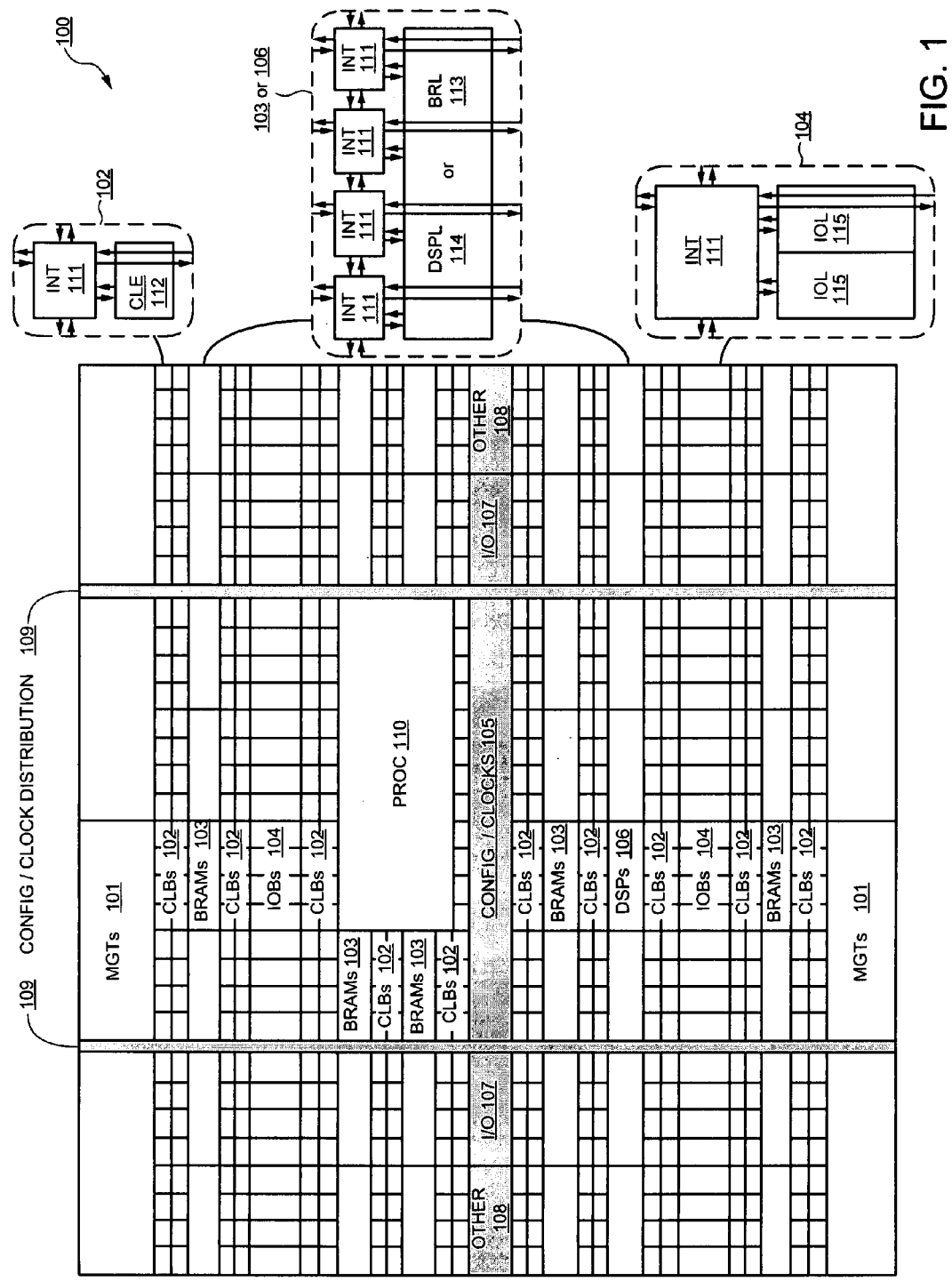
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

The following examples are described in terms of implementing some number of operation specific floating-point processing units ("OFPU") in an FPGA to perform a sequence of floating-point operations. From the following description, it should be appreciated that programmable logic, as well as special purpose logic, available in an FPGA may be used for implementing each of the OFPUs as part of the sequence of floating-point operations. This is in contrast to the current methodology whereby a single general purpose floating-point processing unit (FPU) is used to process all floating-point operations of the sequence in order. Using such configurations of an FPGA, each OFPU may be tailored to perform only that floating point operation required within the sequence of floating-point operations. However, rather than programmable logic of the FPGA fabric, it should be appreciated that dedicated logic may be used to provide each OFPU in accordance with the following description. Moreover, even though the following description is in terms of an IEEE-754 floating-point format, it should be appreciated that other types of floating-point formats may be used.

In order to more clearly describe floating-point operations, an example Equation (1) is used:

$$\text{Result}R[i]=((\text{Input}A[i]+\text{Input}B[i])*\text{Input}C[i])+\text{Input}D[i] \quad (1)$$

However, it should be appreciated that other equations may be used, including other mathematical operations other than multiplication and addition. For example, other mathematical floating-point operations may include square root, division, subtraction, sine, cosine, averaging, and Fast Fourier Transformation, among other known floating-point operations. In the example of Equation (1), there are four input vectors A[i] through D[i]. The result for each instance of i is a vector ResultR[i]. Thus, it should be appreciated that input vector A[i] may be a set of values where the number of values in a set equals i. Correspondingly, input vectors B[i] through D[i] may be respective sets of values. For purposes of clarity by way of example and not limitation, it shall be assumed that vector A[i] is the set of values (a1, a2), vector B[i] is the set of values (b1, b2), vector C[i] is the set of values (c1, c2), and vector D[i] is the set of values (d1, d2). It should be appreciated that even though each of the inputs is expressed as a vector input, a constant may be used.

The term "vector" may imply a set of related numbers. Vectors are used in many types of applications. Representing positions in space such as for graphic processing is one example. Another example may be a position defined by a longitude and a latitude. Another example may be to represent molecules. Another example may be used to represent different physical properties. These are but a few examples of how vector values are used, and of course there are many other examples, and thus many other applications in which an FPU may be implemented. However, it is not necessary that vectors be used. For example, rather than vectors a stream of numbers, which may or may not be related, may have floating-point operations performed on them. While such a stream of numbers may be considered a vector input, such stream of numbers need not be considered a vector input. However, for purposes of clarity and not limitation, a vector input shall be assumed even though any stream of numbers may be used in accordance with the following description.

Figure 2:
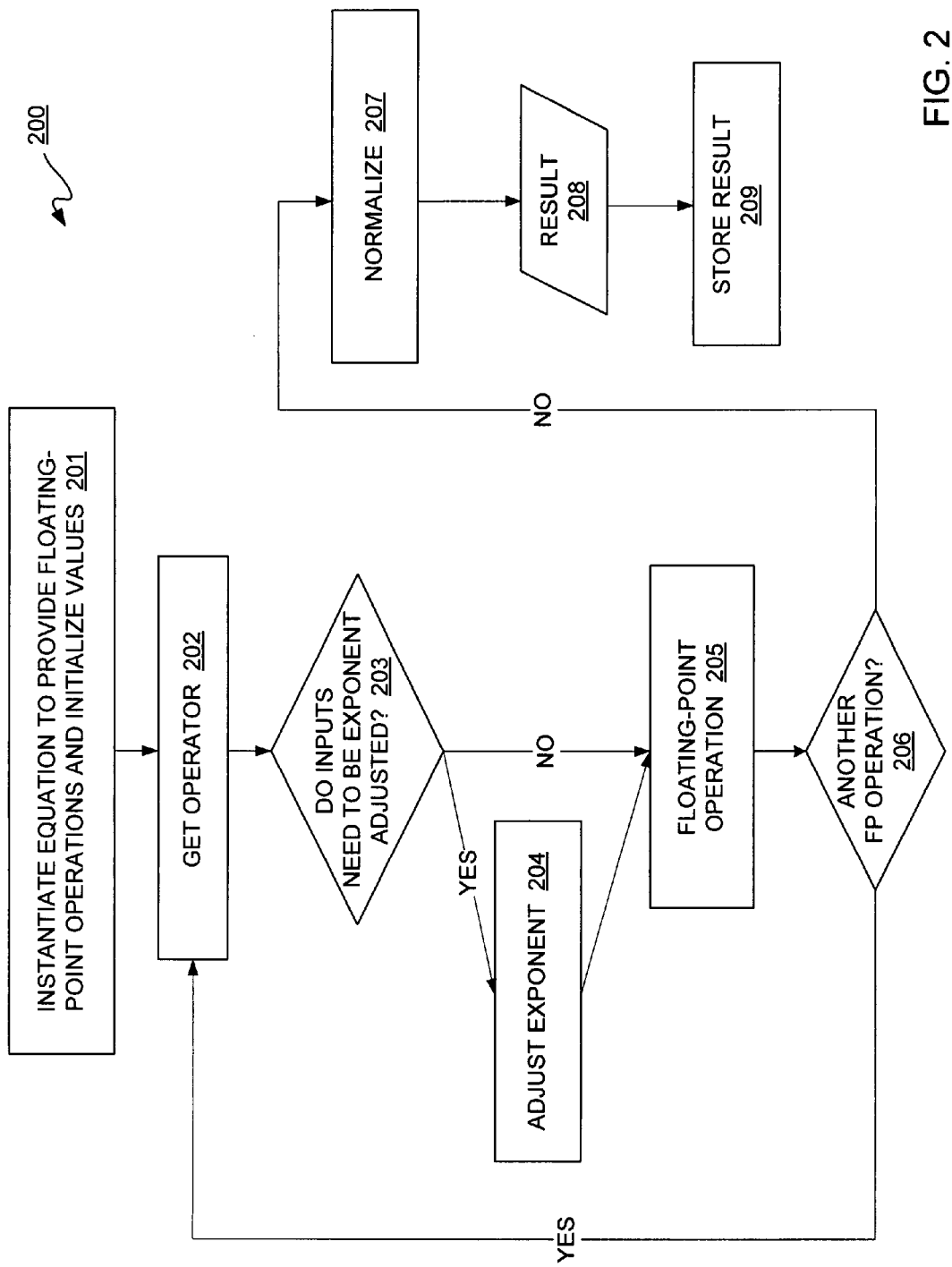
FIG. 2 is a flow diagram depicting an exemplary embodiment of a floating-point operation flow.

FIG. 2 is a flow diagram depicting an exemplary embodiment of a floating-point operation flow 200. At 201 of floating-point operation flow 200, operation specific floating-point units ("OFPU") are instantiated in logic of an FPGA, such as FPGA 100 of FIG. 1, and values associated with such floating-point operations are initialized. This logic of an FPGA may be programmable logic, application-specific logic, or a combination thereof. During this step, an equation, such as Equation (1), is instantiated in FPGA logic. The vectors associated with the equation may be obtained from memory or otherwise obtained at 201.

At 202 the first floating point operator of the equation (e.g., InputA[i]+InputB[i]) is gotten and analyzed at 203 to determine if the input values need to be exponent adjusted (204). The addition operation requires that both inputs have a common exponent so exponent adjustment is required. The exponent of either number could be chosen as the common exponent, which would require the exponent adjustment of the other number. As previously described, this may thought of as shifting the mantissa and incrementing or decrementing the exponent. Thus, for example, the mantissa associated with the value of b1 may be shifted such that b1 is exponent adjusted and the exponents of a1 and b1 are equivalent. Conversely, a1 may be exponent adjusted to be operated upon with b1. As described below in additional detail, because vector input may be in a normalized form or a non-normalized form, an alternative to exponent adjusting a value may be to normalize a value for exponential equivalence.

In order to more clearly understand normalization and exponent adjustment, example values are now provided. Suppose a1 equals $2 \times 10^3$, b1 equals $2 \times 10^1$, c1 equals $5.1 \times 10^{-3}$ and d1 equals $1.0 \times 10^{-3}$. These values are all in normalized format and represent the input values InputA[i], InputB[i], InputC[i], and InputD[i]. The mantissas for these expressions are 2, 2, 5.1, and 1 respectively and the exponents are 3, 1, −3, and −3, respectively. Notably, the base value, namely base 10, is the same for each these values in this example. In IEEE-754 notation, rather than a base 10, a binary or base 2 value would be used. However, base 10 is used herein as it is mathematically easier to understand. Continuing the example, b1 may be exponent adjusted to be $0.02 \times 10^3$. No exponent adjustment is performed upon any other numbers at this time. Finally the result of the first operation $(2 \times 10^3 + 0.02 \times 10^3)$ is computed at 205. Let this result $(2.02 \times 10^3)$ be referred to as $t_1$. Normalization of this value is not performed at this time.

At 206 it is noted that remaining floating point operations remain to be processed for this FPU, so the inputs for the second floating point operation ($t_1$*InputC[i]) are obtained. Since this floating point operation (*) does not require exponent agreement, as determined in step 203, 204 is not required and these numbers can be directly operated upon at 205.

Suppose that c1 equals $5.1 \times 10^{-3}$. The result of this operation $(2.02 \times 10^3 * 5.1 \times 10^{-3})$ is computed at 205. Let this result $(10.302 \times 10^0)$ be referred to as t2. Normalization of this number is not performed at this time.

Again it is noted at 206 that another floating point operation remains to be performed for this FPU, so the inputs for the third and final floating point operation (t2+InputD[i]) are obtained. Since this floating point operation (+) does require exponent agreement, as determined in step 203, these inputs must be exponent adjusted at 204. Suppose that $d1 = 1.0 \times 10^{-3}$. In this example we can exponent adjust d1 to $0.001 \times 10^0$ such that it has the same exponent as $t_2$ (i.e., 0). The operation is performed and the result $(10.303 \times 10^0)$ is obtained. Since this is the final floating point operation in this FPU, control passes from 206 to 207 where this result is now normalized to obtain the final result, $1.0303 \times 10^1$. This value is then passed out of the instantiated FPU at 208.

In the present example, results are stored in normalized form in compliance with the IEEE-754 standard. However, it should be appreciated that normalized or non-normalized notations may be used as described herein, and thus it is not necessary to store values which are likely to be subject to subsequent floating-point operations in normalized form. Furthermore, it should be appreciated that in contrast to normalizing after each floating-point operation, normalization is done after all floating-point operations are complete for all i vector values. Alternatively, such normalization may wait until all results R[i] have been obtained.

Figure 3:
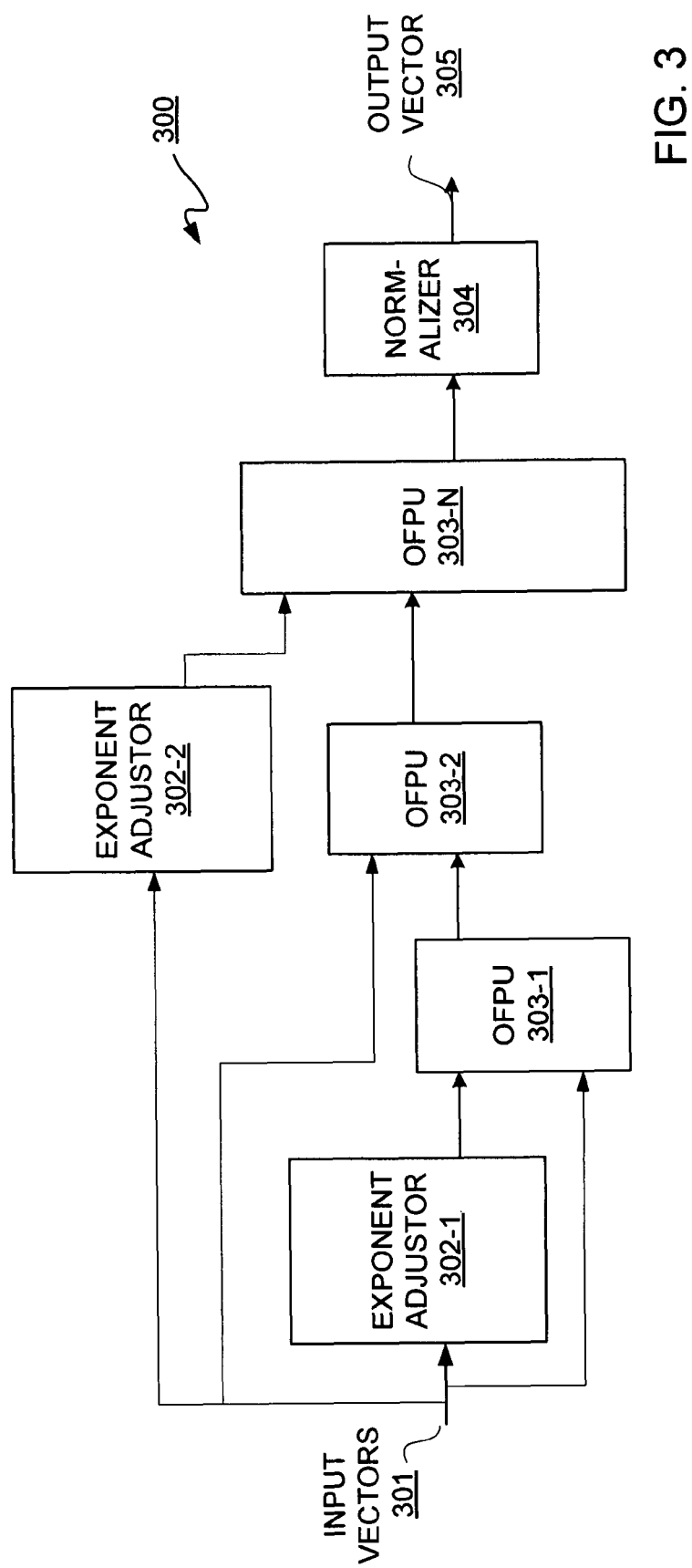
FIG. 3 is a block diagram depicting an exemplary embodiment of a floating-point processor unit ("FPU") including three operation specific floating-point processor units ("OFPU").

FIG. 3 is a block diagram depicting an exemplary embodiment of an FPU 300. FPU 300 includes exponent adjustors 302-1 and 302-2 and two or more operation specific floating-point units (OFPU) 303-1 through 303-N coupled in series, for N a positive integer greater than one. For purposes of clarity by way of example, it shall be assumed that N is equal to three. However, more or less than three OFPUs may be implemented, as shall be appreciated from the following description. Further, in the illustrated examples two exponent adjustors are included, but this number may vary as needed. Additionally, a normalizer 304 is preferably included before any data is output from FPU 300.

Input vectors 301 are provided to exponent adjustors 302-1, 302-2 for adjusting exponent values to be equal if needed, as previously described with reference to the operation specific floating-point operation flow of FIG. 2. A portion of the input vectors 301, some of which might have had their exponent adjusted for equalizing exponents, is provided to OFPU 303-1 by exponent adjustor 302. OFPU 303-1 includes only those circuits required for carrying out a single floating point arithmetic function. No exponent adjustment is performed by OFPU 303-1 An example of an OFPU is described below. However, it should be appreciated that other implementations may be used.

OFPUs 303-2 thru 303-N in this example are coupled to receive output from OFPU 303-1 as well as another portion of input vectors 301, some of which have had their exponent adjusted for equalizing exponents. Output of OFPU 303-N may be provided to a normalizer 304, which may be an option, or may be provided for storage if subsequent floating-point operations are to be conducted. Thus, it should be appreciated that between OFPUs 303-1 and 303-2, and between OFPUs 303-2 and 303-N, no normalization occurs. Output of normalizer 304 will be output vector 305.

Figure 4:
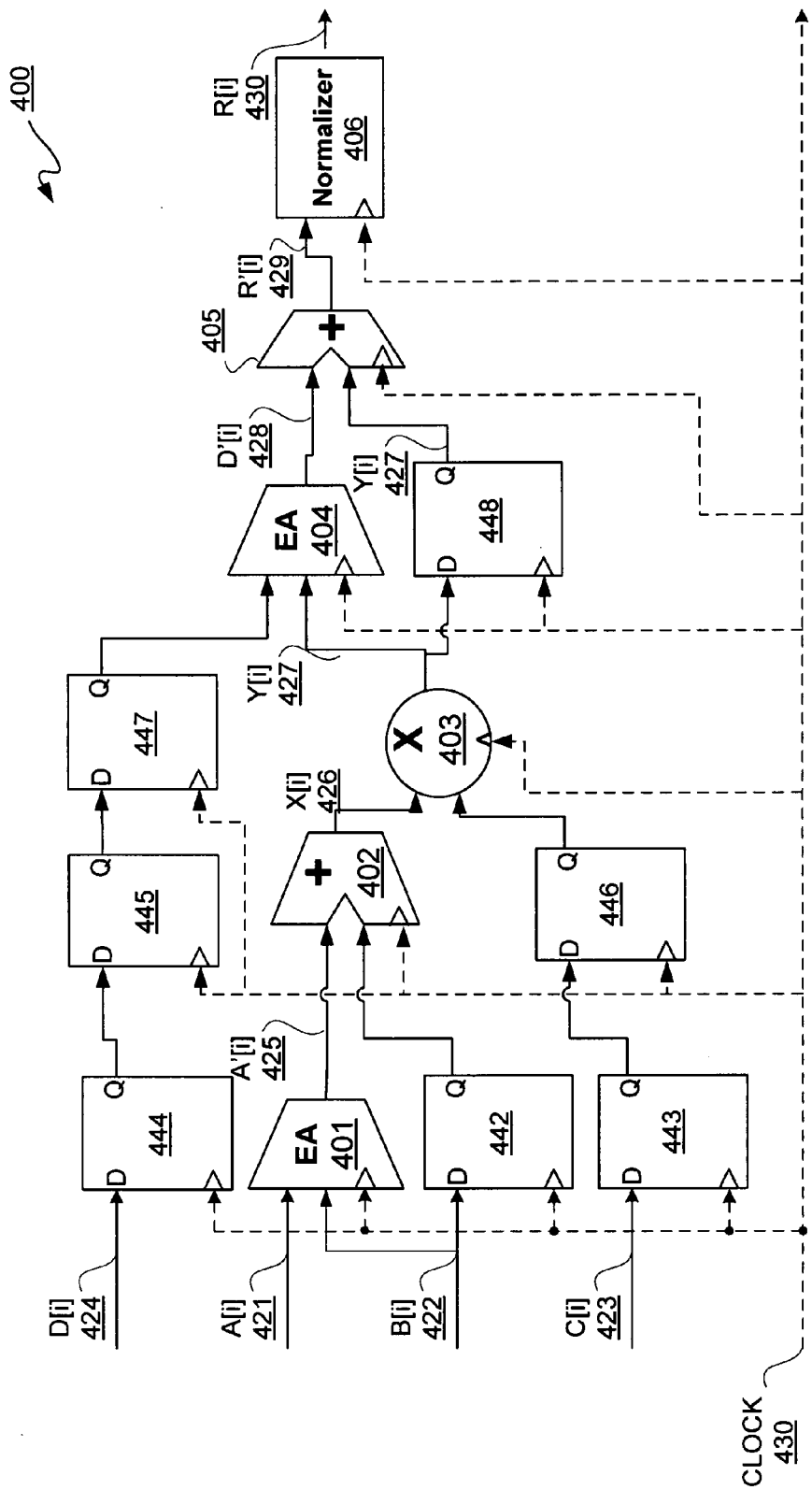
FIG. 4 is a block/circuit diagram depicting an exemplary embodiment of the FPU of FIG. 3.

FIG. 4 is a block/circuit diagram depicting an exemplary embodiment of a floating-point unit (FPU) 400. FPU 400 may represent an implementation of FPU 300 of FIG. 3, for example, for carrying out example Equation (1).

Each ith value of input vectors A[i] through D[i], namely each of vector values 421 through 424 respectively, is input to a first sequential stage. This first sequential stage is implemented with exponent adjustor 401 and flip-flops 442 through 444. Vector values 422 through 424 are respectively provided to data input ports of flip-flops 442 through 444. Vector values 421 and 422 are provided to exponent adjustor 401 which outputs A'[i] at 425, a value of A[i] that has the same exponent as B[i]. Note that in the pictured embodiment logic blocks 401 through 406 and flip-flops 442 through 448 are all clocked responsive to the same clock signal 430. Thus, the outputs of flip-flops 442 through 444 and exponent adjustor 401 are all synchronous with respect to clock signal 430.

Outputs of exponent adjustor 401 and flip-flop 442 are provided to input ports of adder 402. Both inputs to this block (425 and a registered version of inputs 422) have identical exponents. Notably, for purposes of clarity, no carry logic is shown. However, it should be appreciated that carry circuitry may be included. Output of adder block 402 at 426 referred to as X[i] is provided as a data input of multiply block 403. Flip-flops 445 and 446 hold and pass on their input data values, registered versions of input vectors D[i] and C[i], respectively, during this sequential stage. The outputs of flip-flops 445 through 446 and adder block 402 are all synchronous with respect to clock signal 430.

The outputs of flip-flops 446 and adder block 402, which might have exponents of differing values, are provided as inputs to multiplier block 403. The output of multiplier block 403 is provided to data input ports of flip-flop 448 and exponent adjustor 404. Flip-flop 447 holds and passes on its input data value, namely a registered version of input vector D[i], during this sequential stage. The outputs of flip-flop 447 and multiplier block 403 are all synchronous with respect to clock signal 430.

The output of multiplier block 403, referred to as Y[i] at 427, and the output of flip-flop 447 are provided as input to exponent adjustor 404. The output of exponent adjustor 404 at 428, D'[i], is a value equal to D[i] with an exponent that is identical to that of Y[i]. Flip-flop 448 holds and passes on its value of Y[i] at this sequential stage. The outputs of flip-flop 448 and exponent adjustor 404 are both synchronous with respect to clock signal 430.

The outputs of flip-flop 448 and exponent adjustor 404 are provided as data input values to adder block 405. Both inputs to this block (427 and 428) will have identical exponents. The output of adder block 405, referred to as R'[i] at 429, is the result of the operation performed, but is not necessarily in normalized format. The output of adder block 405 is synchronous with clock signal 430.

The output of adder block 405 is provided to normalizer block 406. Normalizer block 406 normalizes the input value R'[i] and outputs the normalized result as R[i] at 430. This value is the final output from this FPU operation.

There are six sequential stages in the illustrated FPU. When the first set of values arrives at inputs 421-424, the computed value will appear at output 430 after these six stages complete. After the first stage (exponent adjustor 401 and flip-flops 442-444) completes, and the output of the first stage has been provided to the second stage, the first stage can accept a new set of values at inputs 421-444. Accepting a new set of input values at each clock cycle allows the computed values to appear at successive clock cycles at the output 430. In this manner, the set of computed output values are produced faster than in a conventional FPU, where each operation must be completed before the next one can begin.

Notably, no normalization occurs between floating-point operations. In this example, no normalization occurs between the floating-point addition by adder block 402 and floating-point multiplication by multiplier block 403, nor between multiplier block 403 and adder block 405.

Although this particular example involves six clock cycles, it should be appreciated that the number of clock cycles will vary depending on the implementation, which may vary from mathematical expression to mathematical expression. Furthermore, in addition to saving on normalization as between floating-point operations, namely not having to have a normalizer after each floating-point operation, fewer cycles may be used to process a vector, by breaking out the floating-point operations into an OFPU. Also, since normalization is not performed until is required, at stage 406 the values produced maintain a maximal amount of accuracy that can be held by the given format. This allow successive operations to be performed without overflow in an FPU according to the present invention, where invalid results might be produced in a traditional FPU where normalization is performed after each operation regardless of the use of that value.

Accordingly, if there is some a priori knowledge that an output of a floating-point operation is not going to be stored, for example on disk for later use, but is going to be processed by a subsequent floating-point operation in very near time, such data, which may be in a non-normalized state, may be temporarily buffered in such an non-normalized state for such subsequent floating-point operation. Accordingly, normalization may be done only at a final phase, thereby reducing the amount of circuitry required to perform the desired series of operations, as well as the amount of time required to process the data.

The inventive circuits and methods (e.g., as shown in FIGS. 3 and 4) provide the ability to minimize round-off errors that are introduced during the normalization phase. When a floating-point number is normalized, it is possible for the number to lose precision as it is changed to have a leading '1' in the significand. When two such numbers are operated upon in normalized form and then the result is normalized, there occurs a greater loss of precision than if the numbers were operated upon in non-normalized form. As an example, consider the following set of two floating-point operations.

$1.000000000001*2^{-12}-$
$1.0*2^{-12}+$
$1.0*2^{-12}$

The exact value of this sum should be $1.0000000000001*2^{-12}$ which equals the original input value. The output from the first subtraction is $0.000000000001*2^{-12}$. This would be normalized into the form of $1.0*2^{-24}$. This value is considered invalid, since its exponent is less than the defined range of exponents (assumed to be −15 to 15 for this example). In IEEE-745 notation this is considered "not a number" (NAN). When a NAN is added to any other value it produces a NAN. Thus, using standard floating point processing the calculated value from this operation would be NAN. Using the OFPUs as defined above where no normalization occurs until needed, the output of the first operation ($0.000000000001*2^{-12}$) could be successfully added to the final value ($1.0*2^{-12}$) to obtain the correct value $1.0000000000001*2^{-12}$. The ability to not normalize a value until it is returned or written to memory allows the correct precision to be maintained such that a valid answer is produced. This is due to the fact that the exponent of any intermediate value never goes beyond the defined minimum or maximum allowable value. In less extreme examples, precision of the result may be lost as a result of the interim normalization, without the value being considered NAN. In either case, the designation of the result as an NAN or the loss of precision is overcome by the circuits and methods described here.

It should be appreciated that the use of programmable logic, such as FPGA fabric, facilitates having an FPU core tailored to particular mathematical expressions, which may vary from application to application, for vector processing. Thus, unused overhead, generally associated with a general purpose FPU core, is avoided. In short, an application-specific FPU core may be provided where normalization circuitry as between floating-point operations is avoided, or at least substantially reduced. However, it will be clear to those of skill in the art that the circuits and methods of the invention are not limited to programmable logic implementations.

For the example of an FPGA implementation, a Xilinx FPGA may include DSP logic elements (DSPLs) having a multiplier and an adder. The adder may be configured for subtraction as well as addition, and accordingly programmable fabric, which includes flip-flops, may be used to isolate individual floating-point operations between sequential elements. Thus, a structure according to the present invention may be implemented in both programmable and application-specific logic of an FPGA. However, it should be appreciated that integrated circuits other than FPGAs or other PLDs may be used.

Again, although the example of IEEE-745 notation is used, it should be appreciated that the scope of the above disclosure is not limited by a single type of exponential notation. A notation that uses a base value raised to some exponential number is common in floating-point operations, and the ability to shift the mantissa to equalize exponents facilitates the methods of the invention as described elsewhere herein. Moreover, because both normalized and non-normalized vector inputs are acceptable for processing, it is not necessary that only normalized values be buffered for input to an FPU for a floating-point operation. Notably, FPGAs may allow for the processing of floating-point numbers with bit sizes not part of the IEEE-745 format. For example, an FPGA may process floating-point numbers with 100 bit exponents and 8 bit mantissas, among other variations from IEEE-745 format. Even though an IEEE-745 format may presently be used by many known forms of hardware and software used for floating-point operations, IEEE-745 has been used herein for purposes of clarity by way of example and not limitation. It should be appreciated therefore that the format used for floating-point numbers is not limited to an IEEE-745 format. Moreover, the floating-point format used may be tailored to an application. For example, one type of application may use Significantly large exponents, such as for comparing distances between stars, for example, while another type of application may use significantly large significands, such as for comparing locations of atoms in a molecule.

While the foregoing describes exemplary embodiments in accordance with one or more aspects of the invention, other and further embodiments in accordance with the one or more aspects of the invention may be devised without departing from the scope thereof, which is determined by the claims that follow and equivalents thereof. Claims listing steps do not imply any order of the steps. Trademarks are the property of their respective owners.

What is claimed is:

1. A floating-point processing unit, comprising:
   an exponent adjustor coupled to receive numerical inputs, the exponent adjustor configured to generate first adjusted values from the numerical inputs;
   the first adjusted values having equivalent exponents as between corresponding first adjusted values;
   a first operation specific floating-point processing unit (OFPU) coupled to receive the first adjusted values;
   the first OFPU including first arithmetic circuitry configured for a first floating-point operation on the first adjusted values to provide first numerical results;
   a second OFPU coupled to receive the first numerical results;
   the second OFPU including second arithmetic circuitry configured for a second floating-point operation on the first numerical results to provide second numerical results;
   a second exponent adjustor configured to provide second adjusted values from the numerical inputs;
   a third OFPU coupled to receive the second numerical results and further coupled to receive the numerical inputs, the third OFPU including third arithmetic circuitry configured for a third floating-point operation on the second numerical results and the numerical inputs to provide third numerical results; and
   the first numerical results not being normalized prior to the second floating-point operation.

2. The floating-point processing unit according to claim 1, wherein the first OFPU is instantiated at least in part in programmable logic.

3. The floating-point processing unit according to claim 2, wherein the first arithmetic circuitry includes an application specific circuitry block.

4. The floating-point processing unit according to claim 3, wherein the application specific circuitry block comprises a digital signal processing block.

5. The floating point processing unit according to claim 1, wherein the exponent adjustor is configured to adjust exponent values of the numerical inputs to provide the first adjusted values from the numerical inputs.

6. The floating point processing unit according to claim 1, wherein at least some of the numerical inputs have different exponential powers.

7. The floating-point processing unit according to claim 1, the second numerical results not being normalized prior to the third floating-point operation.

8. The floating point processing unit according to claim 1, further comprising:
   a normalizer coupled to receive the third numerical results and configured to normalize non-normalized values of the third numerical results.

9. A method for floating-point processing, comprising:
   instantiating floating-point operations in circuitry, the instantiating including providing a plurality of operation specific floating-point processing units (OFPUs);
   obtaining numerical inputs to be processed using the floating-point operations;
   equalizing first exponents of associated values of a first portion of the numerical inputs to a first exponent;
   performing a first floating-point operation of the floating-point operations with a first OFPU on the first portion of the numerical inputs to provide a first numerical result;
   the first numerical result having the first exponent;
   equalizing second exponents of one or more associated values of a second portion of the numerical inputs and the first numerical result to a second exponent;
   performing a second floating-point operation of the floating-point operations with a second OFPU on the first numerical result and on the second portion of the numerical inputs to provide a second numerical result;
   the second floating-point operation being performed without normalizing the first numerical result obtained from the first floating-point operation; and
   the second numerical result having the second exponent.

10. The method according to claim 9, wherein the equalizing the first exponents includes exponent adjusting at least one of the associated values of the first portion of the numerical inputs to the first exponent; and wherein the equalizing the second exponents includes exponent adjusting at least one of the associated values of the second portion of the numerical inputs or the first numerical result to the second exponent.

11. A method for floating-point processing, comprising:
providing floating-point operations in circuitry in stages;
wherein the floating-point operations include first, second, and third floating point operations in respective ones of the stages;
obtaining numerical inputs to be processed using the floating-point operations;
equalizing exponents of associated values at least in part for respective portions of the numerical inputs;
wherein the equalizing of exponents includes:
equalizing exponents for respective portions of the numerical inputs in a stage that precedes the stage of the first floating point operation; and
equalizing exponents for numerical results output from the second floating point operation in a stage that precedes the stage of the third floating point operation; and
performing the floating-point operations in the stages for processing with the circuitry to provide numerical results without normalization between the floating-point operations.

12. The method of claim 11, wherein the performing the floating-point operations to provide numerical results without normalization between the floating-point operations allows the numerical results to remain within a permissible range of values.

13. The method of claim 11, wherein the performing the floating-point operations to provide numerical results without normalization between the floating-point operations retains a precision of the numerical inputs in the numerical results.

14. The method according to claim 11, wherein the equalizing is done separately for each of the stages.

15. The method according to claim 11, wherein the equalizing includes exponent adjusting at least part of each of a first portion and a second portion of the respective portions; and wherein the second portion of the respective portions is exponent adjusted while the first portion of the respective portions having already been exponent adjusted is being processed by a floating-point operation of the floating-point operations.

16. The method according to claim 15, wherein the floating-point operations are instantiated in a combination of programmable logic and application specific logic; wherein the application specific logic is associated with providing floating-point arithmetic functions associated with the floating-point operations.

17. The method according to claim 16, wherein the programmable logic and the application specific logic are included in a single programmable logic device.

18. The method according to claim 11, wherein the floating-point arithmetic operations include one or more of addition, subtraction, multiplication, division, square root, sine, cosine, averaging, and Fast Fourier Transformation.

* * * * *